(12) United States Patent
Mueller

(10) Patent No.: US 12,034,708 B2
(45) Date of Patent: *Jul. 9, 2024

(54) METHOD AND REPRODUCTION UNIT FOR REPRODUCING PROTECTED MESSAGES

(71) Applicant: dSPACE GmbH, Paderborn (DE)

(72) Inventor: Bjoern Mueller, Paderborn (DE)

(73) Assignee: DSPACE GMBH, Paderborn (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/005,365

(22) PCT Filed: Jul. 15, 2021

(86) PCT No.: PCT/EP2021/069696
§ 371 (c)(1),
(2) Date: Jan. 13, 2023

(87) PCT Pub. No.: WO2022/013335
PCT Pub. Date: Jan. 20, 2022

(65) Prior Publication Data
US 2023/0353544 A1    Nov. 2, 2023

(30) Foreign Application Priority Data

Jul. 17, 2020  (DE) .......................... 102020118960.5

(51) Int. Cl.
*H04L 9/40* (2022.01)
*H04L 41/14* (2022.01)

(52) U.S. Cl.
CPC .......... *H04L 63/0428* (2013.01); *H04L 41/14* (2013.01); *H04L 63/123* (2013.01)

(58) Field of Classification Search
CPC .................................................. H04L 63/0428
(Continued)

(56) References Cited

U.S. PATENT DOCUMENTS 8,503,681 B1 *  8/2013  McGrew ............... H04L 63/065
                                                          713/171
8,539,608 B1 *  9/2013  Troxel .................. H04L 63/123
                                                            726/13
(Continued)

FOREIGN PATENT DOCUMENTS

WO    WO 2020165067 A1    8/2020

*Primary Examiner* — Dant B Shaifer Harriman
(74) *Attorney, Agent, or Firm* — LEYDIG, VOIT & MAYER, LTD.

(57) ABSTRACT

A method for sending registered secure messages via a messaging system to a receiver device that is to be tested includes: supplying first secure and still serialized messages from message packages for processing in a reproduction unit; in the first messages, reducing the data volume of the serialized messages; deserializing the reduced first messages and creating second secure messages by adding a second counter value in each case or, where applicable, by replacing a first counter value with the second counter value, and creating and adding a second authenticator in each case by using the second counter value, the encryption information, and the key, and by using the communication description or the information obtained by applying a data interpretation algorithm; and serializing the second secure messages and sending corresponding message packages to the receiver device to be tested.

13 Claims, 7 Drawing Sheets

(58) Field of Classification Search
USPC .......................................................... 713/170
See application file for complete search history.

(56) References Cited

U.S. PATENT DOCUMENTS

| | | | | |
|---|---|---|---|---|
| 9,077,521 | B2* | 7/2015 | Machani | H04L 63/123 |
| 9,160,719 | B2* | 10/2015 | Marlow | H04L 63/0428 |
| 9,201,722 | B1* | 12/2015 | Moeller | H04L 1/1685 |
| 9,866,396 | B2* | 1/2018 | Buckley | H04L 63/14 |
| 10,855,440 | B1* | 12/2020 | Alwen | H04L 9/0894 |
| 11,101,999 | B2* | 8/2021 | Leavy | H04L 9/0643 |
| 2013/0283059 | A1* | 10/2013 | Sabapathy | H04L 63/0407 |
| | | | | 713/189 |
| 2015/0095997 | A1 | 4/2015 | Mabuchi | |
| 2015/0172298 | A1* | 6/2015 | Otsuka | H04L 63/123 |
| | | | | 726/30 |
| 2016/0380770 | A1* | 12/2016 | Whitmer | G06F 21/64 |
| | | | | 713/181 |
| 2017/0331699 | A1 | 11/2017 | Lee et al. | |
| 2019/0123906 | A1* | 4/2019 | Walrant | H04L 9/0631 |
| 2019/0123908 | A1* | 4/2019 | Morita | H04L 9/3242 |
| 2021/0373545 | A1 | 12/2021 | Mueller | |
| 2023/0076669 | A1* | 3/2023 | Acharya | H04W 4/44 |
| 2023/0421545 | A1* | 12/2023 | Shanbhogue | H04L 63/0457 |
| 2024/0007295 | A1* | 1/2024 | Miyamoto | H04L 9/0891 |

* cited by examiner

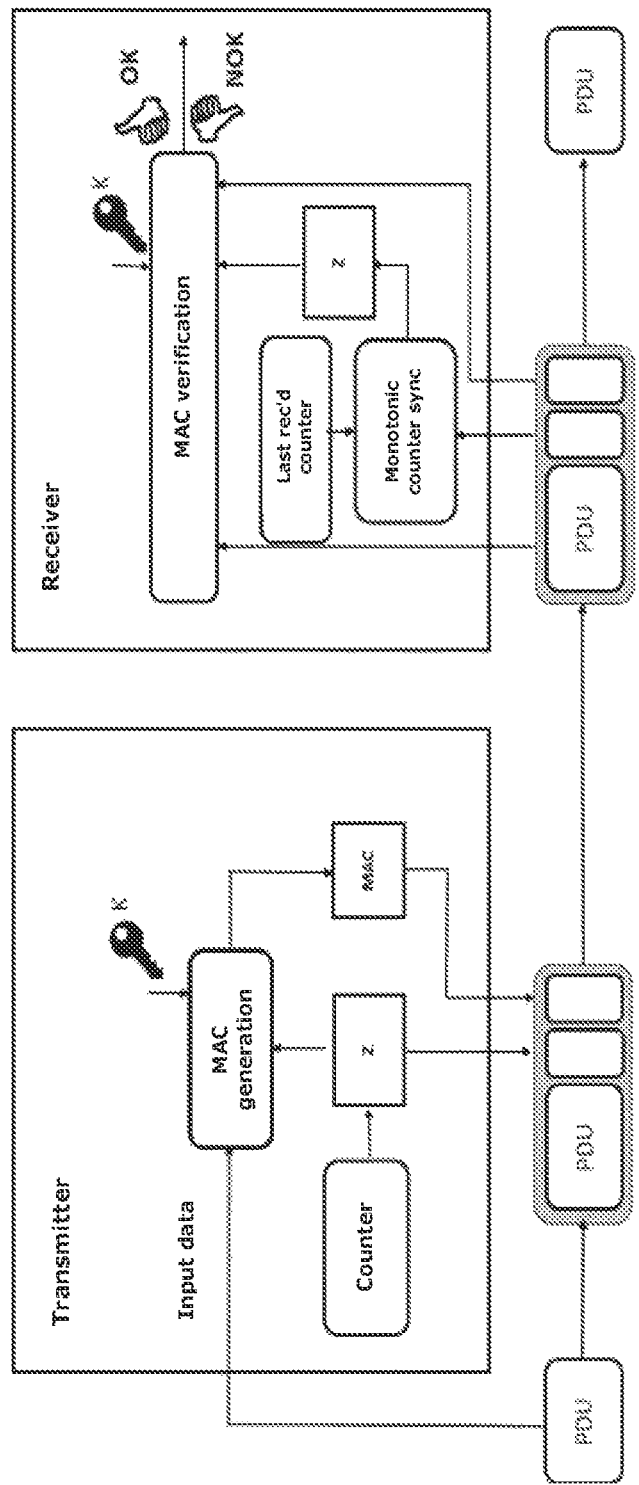

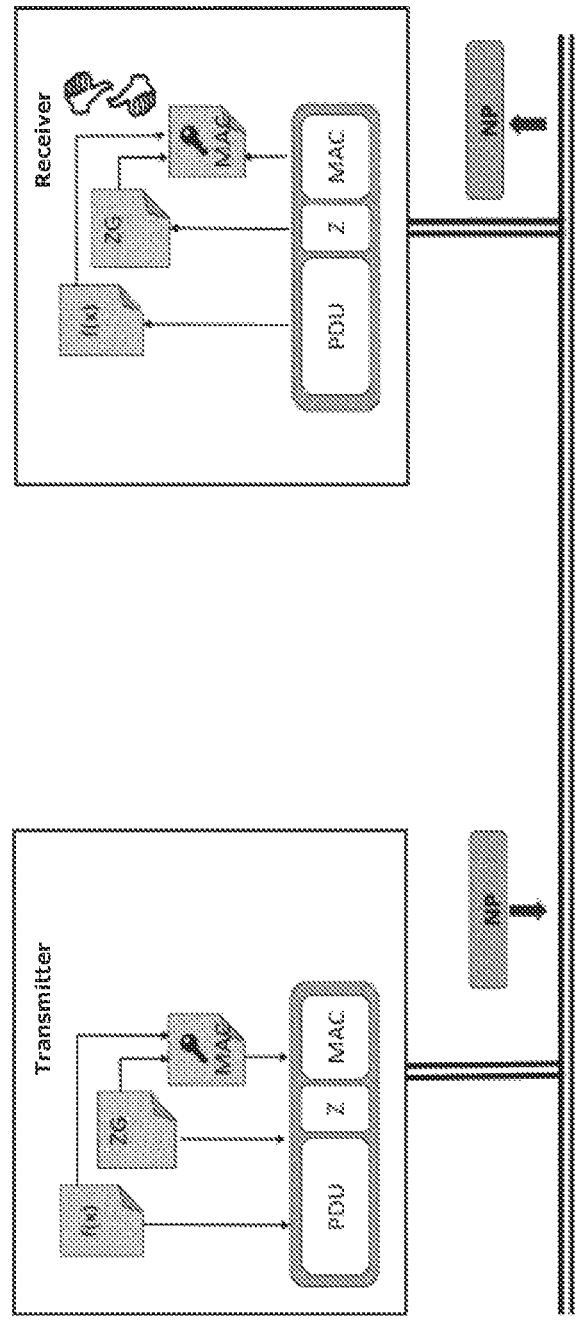

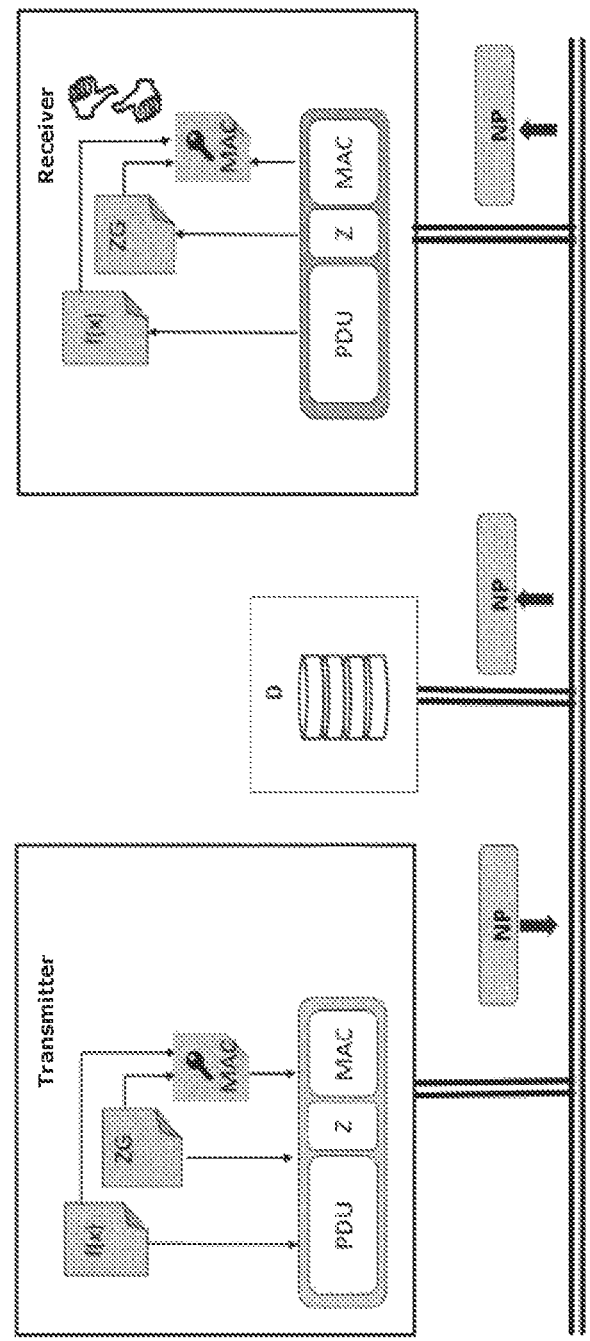

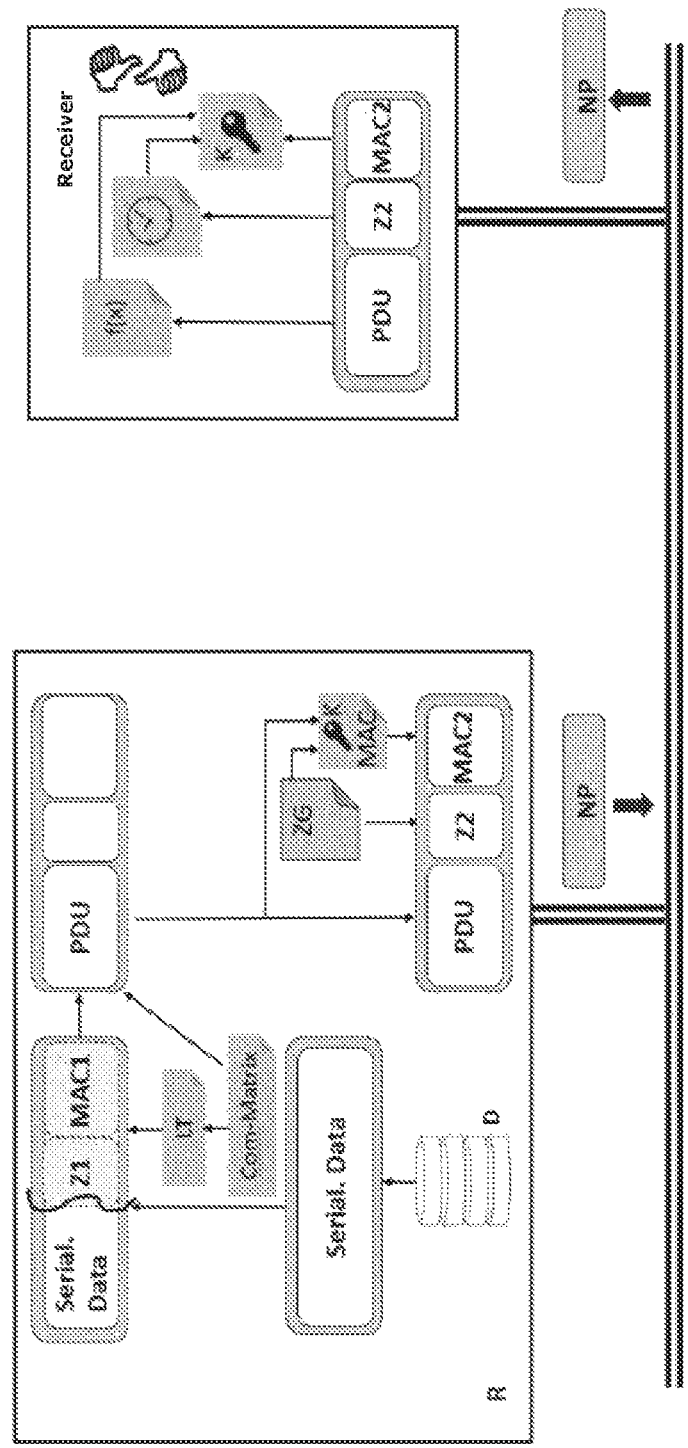

Fig. 6

METHOD AND REPRODUCTION UNIT FOR REPRODUCING PROTECTED MESSAGES

CROSS-REFERENCE TO PRIOR APPLICATIONS

This application is a U.S. National Phase application under 35 U.S.C. § 371 of International Application No. PCT/EP2021/069696, filed on Jul. 15, 2021, and claims benefit to German Patent Application No. DE 10 2020 118 960.5, filed on Jul. 17, 2020. The International Application was published in German on Jan. 20, 2022 as WO 2022/013335 A1 under PCT Article 21(2).

FIELD

The invention relates to a method and to a reproduction unit for sending registered secure messages via a messaging system to a receiver device that is to be tested, in particular to a control device that is to be tested.

BACKGROUND

In the field of bus simulations for testing control devices, for example in the automotive sector, the focus is on modeling the bus communication of one or more control devices as realistically as possible. In the field of control device (ECU) validation, manipulation of the bus communication also plays a role.

In this case, the bus communication can be modeled by a 'live' simulation in a test environment (e.g., via MicroAutobox, VEOS, or SCALEXIO products from dSPACE GmbH for an offline or hardware-in-the-loop (HIL) simulation) or by reproducing (replaying) a recorded bus communication.

In the simplest case, for the communication used in vehicles the transmitted signals are sent as the sole payload data in bus or network messages.

However, new standards (AUTOSAR≥4.2.1 and FIBEX≥4.1.2) have expanded this such that the payload data are additionally authenticated or protected (see, for example, Secure Onboard Communication, Cryptographic PDU, Transport Layer Security, IPsec (Internet Protocol Security)).

The data generated in a control device or as part of a bus simulation are repeatedly recorded in order to be reproduced later for testing purposes. Previously, the recorded bus communication could be played back again unchanged, so as to thus simulate a correct bus communication for one or more receiver control devices.

The bus communication can be logged, for example, by dSPACE GmbH tools (Bus Navigator or Autera). Tools of this kind are often also able to reproduce the recorded, stored bus communication.

The new encryption and authentication algorithms in the aforementioned standards are aimed at preventing what are known as 'replay attacks.' Bus communication secured using these algorithms thus cannot be readily used for stimulating control devices by simple reproduction (replay).

Generally, the secure messages recorded in the vehicle or simulated for testing purposes using a simulator contain information including a header, payload data, a monotonically increasing counter value, and an authentication code (encrypted).

The problem for reproduction is that, although the payload data may be correct, in all likelihood the counter value of the recorded data does not match the counter value of the control device to be tested (since the counter increases monotonically, it cannot be changed either). Even if it could be reset, the authenticator value (or authenticator) created for the authentication would no longer match the counter value since the encrypted authenticator value is composed of the counter value and a value established on the basis of the payload data.

Previously, if this problem occurred in the early development phases, the authentication in the receiver control device was usually deactivated. In that case, however, the authentication can no longer be tested.

The PCT application with the official file reference PCT/EP2020/053254 describes a solution to this problem whereby the authenticator and counter value are removed from the secure messages and replaced with newly determined values.

However, the fact that the messages are sent on the bus or in the network in serialized form causes issues in this case. When in serialized form, the messages still consist solely of data, without any information as to the type of data or as to which data are located where in the message, meaning that the data that need replacing cannot be discerned without deserialization. Converting the complete messages from serialized form into deserialized and decoded messages in order to actually be able to identify the data that are to be replaced requires both time and computing power.

SUMMARY

In an exemplary embodiment, the present invention provides a method for sending registered secure messages via a messaging system to a receiver device that is to be tested. The messages are sent using serialized message packages. The method has the following steps: supplying first secure and still serialized messages from message packages for processing in a reproduction unit, wherein the first messages are provided by the payload of the message packages and, in turn, have payload data, a first counter value, and a first authenticator, wherein the following information is made available to the reproduction unit: at least parts of a communication description for the receiver device to be tested and/or a data interpretation algorithm, a second counter value for the receiver device to be tested, and encryption information and a corresponding key; by means of the reproduction unit: in the first messages: reducing the data volume of the serialized messages by identifying the position of the payload data or the position of the first authenticator and removing at least the first authenticator and, where applicable, the first counter value from the secure and serialized first messages; and deserializing the reduced first messages and creating second secure messages by adding the second counter value in each case or, where applicable, by replacing the first counter value with the second counter value, and creating and adding a second authenticator in each case by using the second counter value, the encryption information, and the key, and by using the communication description or the information obtained by applying the data interpretation algorithm; and serializing the second secure messages and sending corresponding message packages to the receiver device to be tested.

BRIEF DESCRIPTION OF THE DRAWINGS

Subject matter of the present disclosure will be described in even greater detail below based on the exemplary figures. All features described and/or illustrated herein can be used alone or combined in different combinations. The features

FIG. 2 is a schematic illustration of Secure Onboard Communication as per AUTOSAR 4.2.1.;

FIG. 3 is a schematic illustration of typical control device communication when using secure communication;

FIG. 4 shows the storage of sent data via a data logger;

FIG. 5a shows a method according to the invention using an extracted lookup table;

FIG. 6 shows a procedure for the data interpretation algorithm.

DETAILED DESCRIPTION

Figure 1:
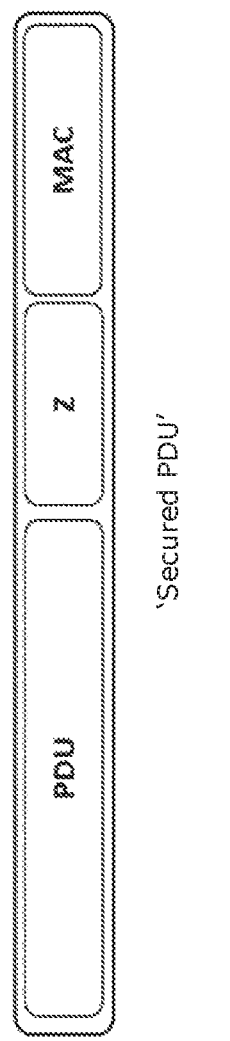
FIG. 1 shows a secure message.

In an exemplary embodiment, the present invention provides a method and a reproduction unit, the method having the following steps:

supplying first secure and still serialized messages from first secure message packages for processing in a reproduction unit, the first messages being provided by the payload of the message packages and, in turn, having payload data, a first counter value, and a first authenticator, the following information being stored in the reproduction unit or being made available to the reproduction unit (in other words, the information either is stored in a storage device associated with the reproduction unit or the reproduction unit has access to the information stored in the test environment):

at least parts of a communication description for the receiver device to be tested and/or a data interpretation algorithm, a second counter value for the receiver device to be tested, encryption information and a corresponding key, via the reproduction unit:

in the first messages: reducing the data volume provided by the serialized first messages by identifying the position of the payload data or the position of the first authenticator in the first messages and removing at least the first authenticator and, where applicable, the first counter value from the first messages, deserializing and decoding the reduced first messages and creating second secure messages by adding the second counter value in each case or, where applicable, by replacing the first counter value with the second counter value, and creating and adding a second authenticator in each case by using the second counter value, the encryption information, and the key, and by using the communication description or the information obtained by applying the data interpretation algorithm, serializing the second secure messages and sending corresponding message packages to the receiver device to be tested.

According to the invention, before being reproduced, the recorded secure messages are manipulated via the reproduction unit such that a receiving device assumes they are correct messages, the data in the still serialized first messages being reduced so that the first messages to be reproduced do not need to be deserialized and decoded in full in order to be manipulated. In general, messages are serialized and then sent in 'message packages' via the messaging system. Generally speaking, 'serialization' should be construed as the encoding of the data and the organizing of that data in message packages, including a header, payload, and a trailer segment, that are to be sent on the messaging system; 'deserialization' is the reverse process.

In this application, serialization and deserialization mostly apply to just one part of said process, namely to the serialization or deserialization of the messages found in the payload of the message packages sent via the messaging system. In the process, information for classifying the data is removed from the messages in the serialization under consideration here and is added in the deserialization.

For example, the data on physical values in a message in deserialized and interpreted form may appear as follows:

Temperature 24° C.

Speed 123 km/h

Altitude 320 meters above sea level

Authenticator 345678→correct

By way of example, an encoded form of the deserialized data would be as follows:

Temperature 10

Speed B24

Altitude 8AF

Authenticator 835D

After serialization, the content of the message (payload data) would be given as: 10B248AF835D The reproduction tool (reproduction unit) according to the invention already identifies and isolates individual components of the messages before deserialization, thereby reducing the volume of the data to be deserialized and decoded.

For the reproduction, a new increasing counter value and a new, suitable authentication code (authenticator) corresponding to the payload data, the counter value, and the encryption algorithm are preferably generated on the basis of the information contained in the communication description and the encryption information specified by the user. The encryption information is dependent on where the invention is deployed, or which security mechanism is provided (examples: SecOC, IPsec, etc.). By way of example, the information comprises the encryption algorithm and any other information related to the encryption algorithm, for example what the algorithm will be applied to (bit or byte). Using this information, a new complete message is generated, or the original first message (now obsolete due to the outdated counter value/authenticator) is reprocessed into a second message that is accepted by the receiver device (i.e., by the (control) device to be tested).

The current counter value (e.g., in the form of a so-called 'freshness value' or 'sequence number') for the control device to be tested is generally globally available and is thus known to the test environment (i.e., the HIL simulator or the offline simulator or a host PC connected to the simulator).

So that the first secure messages can actually be manipulated in order to create second secure messages, either a communication description (or required portions thereof, for example a communication matrix, or at least parts thereof; also referred to as 'C matrix') or an algorithm for interpreting the data contained in the messages is stored in the reproduction unit so that the counter value and the authenticator can be identified in the messages.

In a first exemplary embodiment, the payload data are identified via a lookup table extracted from the communication description, the lookup table containing at least the message ID, the position of the payload data, and the length of the payload data. Optionally, the lookup table also contains the information on the position of the counter in the first secure and still serialized messages. Further C matrix information, such as the transmitter, receiver, initial values, data type, trigger, and CompuMethod, are disregarded.

The lookup table is preferably created from the communication description in an automated manner before the above-mentioned method steps according to the invention are carried out and is stored in the reproduction unit or in the test environment with the reproduction unit having access thereto. Particularly preferably, the lookup table entries are ordered depending on the frequency with which a message occurs, such that frequently occurring messages are listed at a particularly quick-to-access position in the table. The frequency of a message may be derived, for example, from information in the communication matrix or be dynamically adjusted during the method on the basis of a managed statistic regarding receipt of the messages. A statistic of this kind is particularly expedient for a service-based communication. Another option for creating the lookup table using the communication description is to first generate an executable communication code for the simulation using the communication description and to deserialize in each case only the first message or, in the case of multiplex messages, the first message type for each message ID, so as to determine the position of the MACs in said first deserialized message or said first deserialized message type and to store at least this information in the lookup table that is to be created in this manner.

In a second exemplary embodiment, the first authenticator is identified by searching through the serialized data of the message packages using the data interpretation algorithm. In the process, the data interpretation algorithm is provided by a suitable algorithm for detecting encrypted information, said detection being carried out, for example, by the algorithm searching for contiguous values of maximum entropy.

The encrypted information can be detected because all current encryption methods produce the highest possible entropy value for the encrypted information (=the greatest 'disorder' possible). This is intended to avoid decryption being possible as a result of statistical tests (n-grams). To detect the encrypted information, therefore, contiguous values of maximum entropy have to be searched for only in the payload data of the first, still serialized messages using a symbol window (preferably a symbol window of a predetermined size depending on the length of the authenticator).

If the positions of the authenticator and the payload data are static, i.e., are fixed for each message, the authenticator need not be searched for continuously for each message, but rather just once for each message ID.

In this embodiment, a lookup table can preferably also be applied, from which the location of the payload data can be established without requiring a complex search or deserialization beforehand.

Time is further saved if the data interpretation algorithm, i.e., the algorithm for identifying the authenticator, is implemented in the hardware of the messaging system, e.g., directly at or downstream of the controller that receives and partly breaks down the message packages sent via the messaging system. This controller may be a commercially available controller (for example an Infineon Aurix) or, for example, be implemented in an FPGA in a 'softcore,' in which case the data interpretation algorithm could then be implemented in the remaining FPGA surface area. However, the data interpretation algorithm could also be integrated in an additional FPGA or ASIC in order to apply it to the messages extracted from the message packages by the controller. In this case, the controller should not necessarily be considered a component of the reproduction unit either; rather, it is part of the test environment and can be actuated by the reproduction unit.

The advantage of additionally working with the data interpretation algorithm is that more time can be saved by implementing the algorithm in the hardware.

In a further embodiment of the invention, the second counter value is provided by the current counter value of the control device to be tested. In an alternative embodiment, the second counter value can be preset by a user or is calculated in accordance with a predetermined counter calculation algorithm.

The reproduction unit preferably contains all the components and/or modules needed to generate said values and for the subsequent merging. In particular, these include the log file import, the C matrix import, the deserialization/serialization, the counter value generation, and the encryption algorithm. Alternatively, however, the components and/or modules may merely make the required information available to the reproduction unit and be implemented not in the reproduction unit but, by way of example, elsewhere in the test environment.

The aforementioned components and modules are known individually as part of different pieces of bus simulation software (for example RTI CAN MM, FlexRay Configuration Package, Ethernet Configuration Package or the Bus Manager) or bus experiment software (Bus Navigator). One difference from the prior art is that, in typical uses, the payload data are generated by an offline or real-time model, whereas in a method according to the invention they are extracted from a log file, disassembled using the identification according to the invention, and recompiled in combination with new content.

In one embodiment of the invention, the payload data, the first counter value, and the first authenticator of a message are sent in a manner spread across at least two message packages (for example, the payload of a first message package contains the authenticator, and the payload of a second message package contains the counter value and the payload data of a message). In another embodiment of the invention, a message package contains (as the payload of the message package) the entire message including payload data, counter value, and authenticator.

Whether the messages are sent in a single message package including the payload data, counter value, and authenticator, or in a manner spread across two or more message packages, is determined by the security mechanism used. The former case applies to SecOC, for example, and the latter case sometimes applies to IPsec. In this regard, it is merely important that a message secured by a particular first authenticator for reproduction purposes is equipped with a second, current authenticator and a corresponding second counter value, which replace the first, obsolete authenticator and the obsolete first counter value.

The receiver device is provided by an actual control device, for example in an HIL test, or by a virtual control device if the bus communication is to be tested as part of a virtual validation.

In this case, 'virtual validation' should be construed as the testing of control devices by simulating the control device network (and its environment, e.g., in the form of a vehicle and a traffic situation) without any concrete hardware and with the aid of a corresponding offline simulator which, for example, also models the time response and the communication of a control device network. A virtual control device is effectively a control device precursor implemented in software and generally already contains the final production code. However, it does not yet require the actual hardware of the control device even though the future operating system is generally already simulated and real-world planning behavior is modeled on the basis of the time and trigger information defined for the functionalities, so the virtual control device can be connected, for example, to a simulated bus (https://www.dspace.com/de/gmb/home/news/engineers-insights/blog-virtuals-ecus-1808.cfm.)

Depending on requirements, the messaging system is provided by a bus communication system, by a network, or by a combination of a bus system and a network, in particular by an automotive messaging system, the messaging system being either physically present or simulated as part of a virtual validation. Using an appropriate test environment, it is also possible to have a combination of a virtual control device with a physically present messaging system, or of a physically present control device with a simulated messaging system.

In a further embodiment of the invention, the payload data of the first secure messages are also encrypted using the first counter value and are initially decrypted in the reproduction unit and then re-encrypted via the encryption and the second counter value. Preferably, the portions of the message that are to be decrypted and encrypted are likewise contained in the encryption information.

In a configuration of a method according to the invention, the method is applied to 'services' which are transmitted in secure messages, thereby also allowing a 'service discovery' to be reproduced, for example of network and/or system services.

Preferably, this also makes it possible to intersperse errors in a targeted manner during the manipulation, i.e., when creating the second secure messages. For example, encryption information may comprise additional information for creating the second secure messages for testing purposes in such a way that the receiver device should detect them as being erroneous. As a result, the security mechanisms can also be tested.

The present invention also provides a reproduction unit for carrying out a method according to the invention.

The reproduction unit according to the invention expands the functioning of reproduction units from the prior art in that the sent messages now no longer consist only of stored messages but, effectively, of newly generated or reprocessed messages that in part contain the old information (in particular the payload data) but have been altered using new information (authenticator and/or counter value) such that they are accepted or purposefully rejected by the receiver device; for the changes, minimal time and computing power are required for the deserialization and decoding since relevant portions of the messages are already identified before deserialization.

Preferably, the reproduction unit is configured as an (add-on) unit for an HIL simulator (in the form of hardware comprising corresponding software) and/or for a simulator for virtual validation (purely as a software unit or an additional program).

The invention allows efficiently secured communication to be recorded in the vehicle and used for later validations, e.g., on the HIL or also in the virtual validation.

The invention will now be described in more detail with reference to the drawings.

The following description of the invention is based on Secure Onboard Communication (SecOC) but can also be carried over to other methods.

In SecOC authentication, the transmission on the medium is different compared with the unsecured transmission of messages since other data in addition to the payload data are now transmitted in the message, allowing the receiver to ascertain whether or not the received data are valid. The original PDU (Protocol Data Unit), which only contained the payload data, now becomes a 'Secured PDU'.

FIG. 1 shows the construction of a secure message of this kind. The 'Secured PDU' is transmitted in a protected communication under the SecOC standard as per AUTOSAR and FIBEX. It is composed of the as yet unencrypted (but mostly encoded) payload data PDU, a counter value Z, and an encrypted authenticator MAC. The payload data PDU are not encrypted, but because the data in the message are not yet serialized the information on which data are to be found and where (counter value Z (in SecOC also referred to as 'FreshnessValue'), authenticator MAC, payload data PDU) is missing, unless the communication description is known, e.g., in the form of the 'C matrix' or communication matrix. Without this information, interpreting the data is complex.

In addition to the as yet unencrypted payload data (now referred to as PDU or also 'Authentic PDU'), the secure message also contains a counter value Z (also referred to as 'FreshnessValue') and an authenticator (Message Authentication Code' MAC). This authenticator MAC is an encrypted value that is calculated via a key algorithm, a secret key K, the payload data PDU, and the counter value Z. This procedure is shown in FIG. 2. The counter value Z is a continuous, monotonically increasing counter value. On the transmitter side, the counter value Z and information/data from the payload data PDU are used to generate the authenticator MAC. The transmitter then creates a message containing payload data PDU, a counter value Z, and an authenticator MAC. On the receiver side, the authenticator MAC and the counter value Z are checked, and on the basis of the check it is decided whether or not the message is valid, or whether or not the payload data may be used.

FIG. 3 shows a normal control device communication when using secure communication.

In a transmission control device (transmitter), the payload data PDU to be transmitted are generated by the application software (f(x)). In addition, a counter value generation module ZG and a generator for the authenticator MAC are present. The serialization, inter alia, takes place in the lower software layers, where it is ascertained by the COM configuration (communication description, e.g., in the form of the C matrix) which data in the message to be transmitted, or in the corresponding message package NP to be transmitted, represent the counter value Z and which represent the authenticator MAC. Once suitably 'packaged', this message is then sent by a suitable controller as a message package NP on the bus/network. On the bus/network, a distinction cannot be drawn between the payload data PDU, counter value Z, and authenticator MAC in the data contained in the serialized message package NP without knowing the C matrix or without a suitable data interpretation algorithm.

When testing control devices, for example using an HIL for real-time tests or using an offline simulator for virtual validation, information on the C matrix, or the C matrix itself, is generally available.

In FIG. 3, the receiving control device (receiver) receives the message and evaluates it in the reverse order to that of the transmitter. On the basis of an authenticator check, it is decided in the receiving control device whether or not the received payload data PDU can be used for the application, i.e., the corresponding function f(x) in the receiver control device.

If a communication between control devices is to be used for reproduction at a later time, the communication is tapped on the bus, or is mirrored in a network via a switch or test access point. This is shown in FIG. 4. A data logger D, which collects the data on a bulk storage device, is typically used for the recording. In this case, storage takes place without the data being interpreted.

In the case of unprotected communications, the data for stimulating the receiving control device can be sent directly to the receiving control device more or less unchanged (potentially with the timestamps being adjusted), without the receiving control device being able to detect a stimulation (replay, i.e., purely a reproduction/playback of registered messages).

In the case of protected communication, however, the recorded data can no longer be used without further manipulation since the monotonic counter would indicate to the receiving control device that the message is outdated. Solely changing the counter would, however, also be unsuccessful since the counter value is incorporated into the calculation of the authenticator MAC together with the payload data.

FIG. 5a shows an embodiment example of a method according to the invention using a reproduction unit R according to the invention.

The recorded data (secure messages) are read out by the bulk storage device D. The data are serialized data Serial. Data, i.e., entirely uninterpreted data in which it is unclear where the signals are located and how they are encoded. At the start of a method according to the invention, from a (very extensive) communication matrix Com-Matrix that is available or input in the reproduction device R, a significantly less extensive lookup table LT is generated, containing the message ID, the position of the payload data, and the length of the payload data. On the basis of the extracted information from the lookup table LT, all the data apart from the payload data PDU of the message are discarded, i.e., in particular the signals of the first counter value Z1 and of the first authenticator MAC1. The remaining, still serialized data (Serial. Data) have to be deserialized in order to obtain the payload data PDU and be able to re-use them for the message to be sent, since the payload data PDU are incorporated into the calculation of the authenticator. In this case, however, the volume of the data to be deserialized is reduced down to the payload data PDU compared with the data of the complete message. Like in the control device or in the bus simulation in the HIL or offline simulator, the signals for the second counter value Z2 and the second authenticator MAC2 are also newly generated in the reproduction device R. In the process, the second counter value Z2 and the key K are supplied by the user, for example. From these, together with the payload data PDU, a valid message is compiled once again, which is then sent via the bus or network as a message package NP once serialization is complete.

Figure 5B:
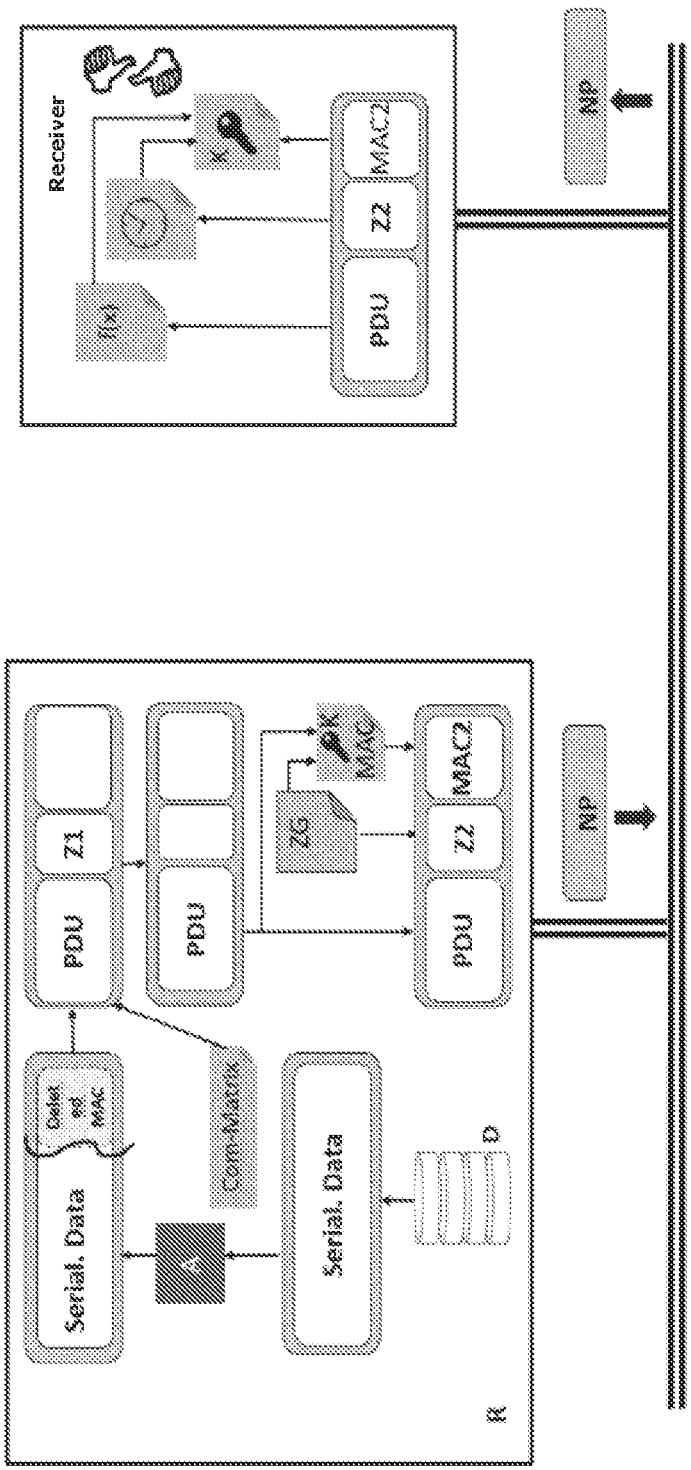
FIG. 5b shows a method according to the invention using a data interpretation algorithm.

FIG. 5b shows another embodiment of the invention. Differences compared with the method described in FIG. 5a are as follows:

A data interpretation algorithm A is used to identify the position of certain message components in the still serialized messages. This algorithm A determines the position of encrypted data inside the message by detecting contiguous values of maximum entropy. Thus, the encrypted authenticator MAC can be determined and discarded so as to in turn reduce the data volume in the message. In a further step, the remaining data of the message are then deserialized, and the counter Z1 is identified and removed. The method then proceeds as in FIG. 5a.

Figure 6:
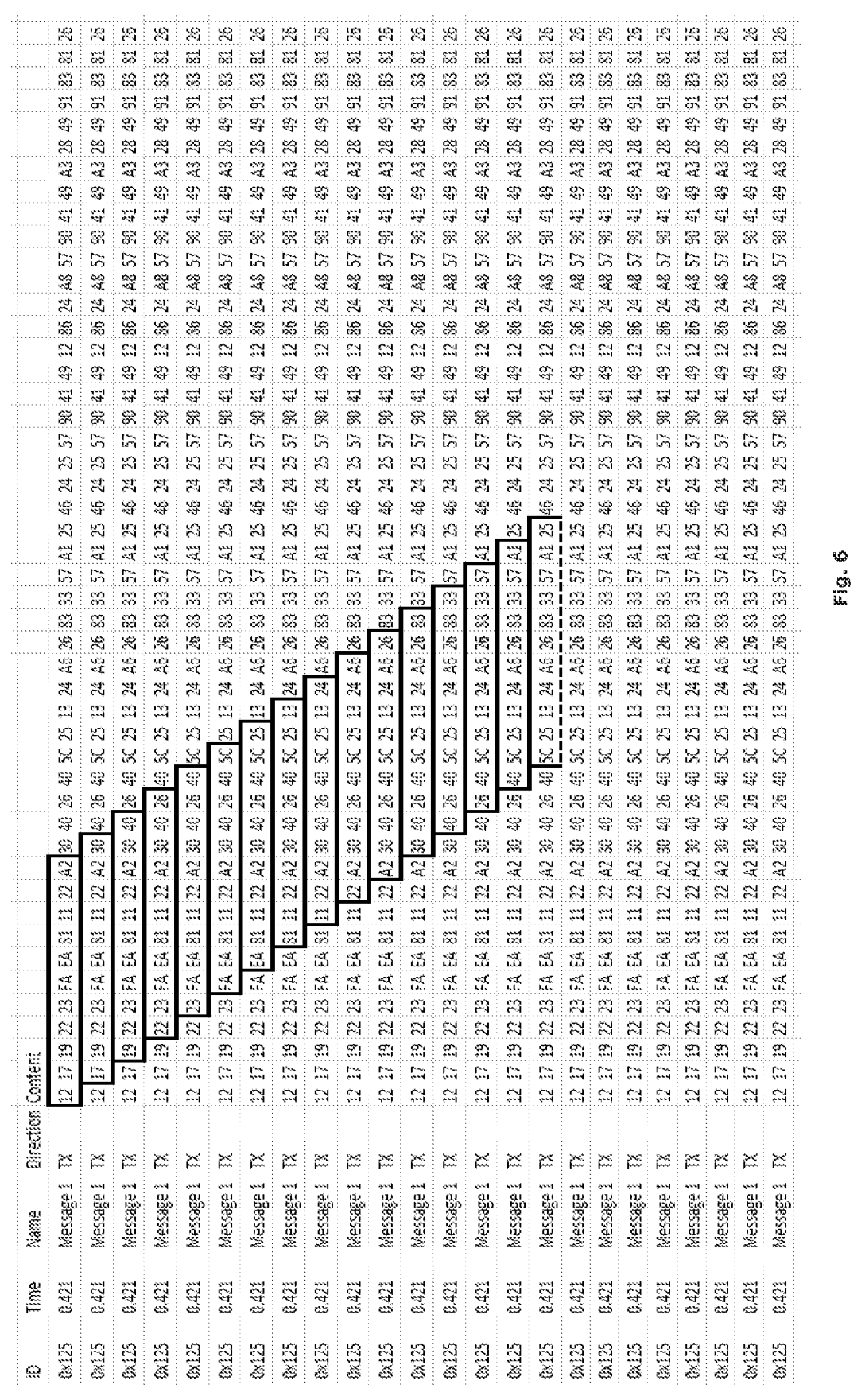

FIG. 6 illustrates an approach for the data interpretation algorithm A. To detect the encrypted information, contiguous values of maximum entropy are searched for in the data of the serialized messages using a symbol window. The size of the symbol window used to search for the first authenticator need not necessarily be predetermined in this case. In principle, the search could be carried out using symbol windows of different sizes. In practice, however, only certain authenticator lengths are used (e.g., AES=128 bit); an authenticator length of this kind is preferably used as the length of the symbol window. The entropy is calculated for each of the windows shown in FIG. 6. The window having the highest calculated entropy is assumed to be the position where the authenticator MAC1 is located.

If, by chance, there are two windows with equally high entropy, re-applying the algorithm to another message of the same ID can bring about a decision.

A further embodiment of the invention involves manipulating the signals for the counter value Z and the authenticator MAC in a targeted manner in order to test the validation measures in the receiving control device. For instance, a correct counter value Z and an incorrect authenticator MAC can be used, or the authenticator MAC is correct and the counter value Z is incorrect.

In security mechanisms other than SecOC, it may be that the message is not sent in a single message package including the payload data, counter value, and authenticator, but in a manner spread across a plurality of message packages, for example in IPsec or cryptographic PDUs. A method according to the invention can also be applied to methods of this kind. In that case, slight adjustments in terms of the counter value may have to be made. In IPsec, for example, the counter value (referred to therein as the sequence number) does not have to monotonically increase, but has to be present in a particular window of sequence numbers ('sliding window').

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for sending registered secure messages via a messaging system to a receiver device that is to be tested, wherein the messages are sent using serialized message packages, wherein the method has the following steps:
  supplying first secure and still serialized messages from message packages for processing in a reproduction unit, wherein the first messages are provided by the payload of the message packages and, in turn, have payload data, a first counter value, and a first authenticator, wherein the following information is made available to the reproduction unit:
    at least parts of a communication description for the receiver device to be tested or a data interpretation algorithm,
    a second counter value for the receiver device to be tested, and
    encryption information and a corresponding key;
  by means of the reproduction unit:
    in the first messages: reducing the data volume of the serialized messages by identifying the position of the payload data or the position of the first authenticator and removing at least the first authenticator and, where applicable, the first counter value from the secure and serialized first messages; and
    deserializing the reduced first messages and creating second secure messages by adding the second counter value in each case or, where applicable, by replacing the first counter value with the second counter value, and creating and adding a second authenticator in each case by using the second counter value, the encryption information, and the key, and by using the communication description or the information obtained by applying the data interpretation algorithm; and
  serializing the second secure messages and sending corresponding message packages to the receiver device to be tested.

2. The method according to claim 1, wherein the payload data are identified by means of a lookup table created from the communication description, wherein the lookup table contains the message ID, the position of the payload data, and the length of the payload data.

3. The method according to claim 1, wherein the first authenticator is identified by searching through the serialized data of the messages using the data interpretation algorithm, wherein the data interpretation algorithm is based on the detection of encrypted information in that said algorithm establishes contiguous values of maximum entropy.

4. The method according to claim 3, wherein the algorithm is implemented in hardware.

5. The method according to claim 1, wherein a message is sent in a manner spread across a plurality of message packages.

6. The method according to claim 1, wherein the receiver device is an actual control device or a virtual control device, and wherein the messaging system is provided by an actual or a simulated bus communication system, by an actual or a simulated network, or by a combination of a bus system and a network, in particular by an automotive messaging system.

7. The method according to claim 1, wherein the second counter value is in each case provided by the current counter value for the receiver device that is to be tested, or wherein the second counter value is provided by a counter value predetermined by a user or by an automatically calculated counter value.

8. The method according to claim 1, wherein the payload data of the first secure messages are also encrypted using the first counter value, and the payload data are decrypted in the reproduction unit and re-encrypted by means of the encryption and the second counter value.

9. The method according to claim 1, wherein the encryption information also comprises information for creating the second secure messages for testing purposes in such a way that the receiver device should detect them as being erroneous.

10. A reproduction tool for sending secure messages via a messaging system to a receiver device that is to be tested,
  wherein the reproduction tool is connected via the messaging system to the receiver device that is to be tested,
  wherein the reproduction tool is configured to obtain, from the payload of registered message packages, first secure and still serialized messages that are to be reproduced, to identify the position of the payload data or the position of a first authenticator in the first secure, still serialized messages, and to remove the authenticator and, where applicable, also the corresponding counter value from the serialized messages and generate a second authenticator by means of a second counter value, an encryption algorithm, and a key, and
  wherein the reproduction tool is configured to generate second secure messages by adding the second authenticator to the first messages and by adding the second counter value, or by replacing the first counter value with the second counter value, and
  wherein the reproduction tool is further configured to send the second secure messages to the receiver device, that is to be tested, via the messaging system in corresponding message packages.

11. The reproduction tool according to claim 10, wherein the reproduction tool is configured as a unit for a hardware-in-the-loop (HIL) simulator or for a simulator for virtual validation.

12. A non-transitory computer readable medium comprising software for sending secure messages via a messaging system to a receiver device that is to be tested, the software storing instructions for executing the following operations:
  obtain, from a payload of registered message packages, first secure and still serialized messages that are to be reproduced, to identify a position of the payload data or a position of a first authenticator in first secure, still serialized messages, and to remove an authenticator and, where applicable, also a corresponding counter value from a serialized messages and generate a second authenticator by a second counter value, an encryption algorithm, and a key, and
  generate second secure messages by adding the second authenticator to first messages and by adding the second counter value, or by replacing the first counter value with the second counter value, and
  send the second secure messages to the receiver device, that is to be tested, via the messaging system in corresponding message packages.

13. The non-transitory computer readable medium according to claim 12, wherein the software is configured as an add on for a hardware-in-the-loop (HIL) simulator or for a simulator for virtual validation.

* * * * *